United States Patent [19]
Matzinger et al.

[11] Patent Number: 6,153,693
[45] Date of Patent: Nov. 28, 2000

[54] ELASTOMERIC-MODIFIED PHENOLIC ROSIN RESINS

[75] Inventors: Michael D. Matzinger, Mt. Pleasant; G. Frederick Hutter, Charleleston, both of S.C.

[73] Assignee: Westvaco Corporation, New York, N.Y.

[21] Appl. No.: 09/248,735

[22] Filed: Feb. 11, 1999

Related U.S. Application Data

[63] Continuation-in-part of application No. 09/061,693, Apr. 16, 1998, abandoned.
[51] Int. Cl.$^7$ .............................. C08G 63/48; C08G 63/91
[52] U.S. Cl. ..................... 525/54.42; 525/54.44; 525/54.45; 530/210; 530/214; 530/215; 530/218; 530/222; 530/230; 530/232; 527/600; 527/601; 527/602; 527/603; 527/604
[58] Field of Search ............................. 525/54.42, 54.44, 525/54.45; 530/210, 214, 215, 218, 222, 230, 232; 527/600, 601, 602, 603, 604

[56] References Cited

U.S. PATENT DOCUMENTS

| | | |
|---|---|---|
| 4,104,143 | 8/1978 | Wasilewski et al. . |
| 4,105,610 | 8/1978 | Jung et al. . |
| 5,041,477 | 8/1991 | Hays . |
| 5,158,606 | 10/1992 | Carlick et al. . |
| 5,376,719 | 12/1994 | Bender . |

*Primary Examiner*—Nathan M. Nutter
*Attorney, Agent, or Firm*—Daniel B. Reece, IV; Terry B. McDaniel; Richard L. Schmalz

[57] ABSTRACT

This invention relates to novel rosin-based resins and the process for preparing them. In particular, the invention relates to elastomeric-modified pigment binder compositions which exhibit properties that make them useful in formulating vehicles for lithographic printing inks and other coating applications.

12 Claims, No Drawings

ELASTOMERIC-MODIFIED PHENOLIC ROSIN RESINS

This application is a continuation-in-part of our commonly assigned, co-pending U.S. patent application Ser. No. 09/061,693 filed Apr. 16, 1998, entitled "Elastomeric-Modified Phenolic Rosin Resins" and now abandoned.

FIELD OF INVENTION

This invention relates to novel rosin-based resins and the process for preparing them. In particular, the invention relates to elastomeric-modified pigment binder compositions which exhibit properties that make them useful in formulating vehicles for lithographic printing inks and other coating applications.

BACKGROUND OF THE INVENTION

Rub resistance is a highly desired property for lithographic inks. Such resistance is needed not only during the end use properties of the printed product, but also during prior processing stages (such as laminating, cutting, and creasing). Because lithographic inks have a high pigment-to-resin ratio, the binder resin usually does not provide all the necessary surface protection needed to prevent rub damage.

The traditional method of addressing this problem of rub damage has been to add a wax to the ink formulation. However, the addition of wax has adverse effects on the characteristics of the ink (among which are a decrease in the gloss of the ink and an increase in the time required to dry the ink).

Therefore, an object of this invention is to solve this major problem by disclosing an improved method of producing resin compositions that exhibit properties which makes them useful in formulating vehicles for lithographic printing inks and other coating applications.

A further object of this invention is to produce lithographic printing inks with enhanced rub resistance.

SUMMARY OF THE INVENTION

The objects of this invention are met by reacting butadiene homopolymers with rosin esters and polyols to produce pigment binder compositions. These compositions may be used to formulate lithographic inks which exhibit enhanced rub resistances.

DESCRIPTION OF THE PREFERRED EMBODIMENT

The improved method for producing pigment binder compositions which enhance rub resistance in lithographic inks comprises reacting in a condensation reaction:

a) about 50% to about 95% by total weight of the reactants of a member selected from the group consisting of rosin esters, phenolic-modified rosin esters, reactive hydrocarbon resins, and combinations thereof;

b) about 2% to about 25% by total weight of the reactants of a member selected from the group consisting of polyols containing from 2 to 6 hydroxyl groups, amines containing from 2 to 5 amine groups, alkanolamines containing from 2 to 6 amine groups and/or hydroxyl groups, and combinations thereof; and c) wherein the improvement comprises the addition of about 2% to about 50% by total weight of the reactants of a member selected from the group consisting of butadiene homopolymers containing at least one amine group, butadiene homopolymers containing at least one carboxyl group, butadiene homopolymers containing at least one hydroxyl group, butadiene homopolymers containing at least one anydride group, butadiene homopolymers containing at least one epoxy group, and combinations thereof, to produce the pigment binder composition.

A preferred method for producing pigment binder compositions which enhance rub resistance in lithographic inks comprises reacting in a condensation reaction:

a) about 60% to about 80% by total weight of the reactants of a member selected from the group consisting of rosin esters, phenolic-modified rosin esters, reactive hydrocarbon resins, and combinations thereof;

b) about 5% to about 15% by total weight of the reactants of a member selected from the group consisting of polyols containing from 2 to 6 hydroxyl groups, amines containing from 2 to 5 amine groups, alkanolamines containing from 2 to 6 amine groups and/or hydroxyl groups, and combinations thereof, and c) wherein the improvement comprises the addition of about 10% to about 25% by total weight of the reactants of a member selected from the group consisting of butadiene homopolymers containing at least one amine group, butadiene homopolymers containing at least one carboxyl group, butadiene homopolymers containing at least one hydroxyl group, butadiene homopolymers containing at least one anhydride group, butadiene homopolymers containing at least one epoxy group, and combinations thereof, to produce the pigment binder composition.

Rosin esters which are suitable for use in the present method include, but are not limited to, products of an esterification reaction between a polyol ester having a chain length of from 2 to 6 carbons and a member selected from the group consisting of maleinized rosin, fumarized rosin, and combinations thereof It is known in the art that rosin (which chemically constitutes a mixture of polyunsaturated polycyclic carboxylic acids) may be modified by reaction with acrylic acid, methacrylic acid, fumaric acid and/or maleic anhydride to yield the resulting Diels-Alder cyclo-adducts, or with maleic anhydride via an "ene"-addition reaction. Rosins which are suitable for use in the present method include, but are not limited to, the following: tall oil rosin, wood rosin, and gum rosin.

Phenolic-modified rosin esters which are suitable for use in the present method include, but are not limited to, the products of a condensation reaction between a rosin ester and a member selected from the group consisting of phenolic resins, allyl-substituted phenols, and combinations thereof.

Reactive hydrocarbon resins which are suitable for use in the present method include, but are not limited to, the products of a polymerization reaction between a member selected from the group consisting of maleinized rosin, fumarized rosin, and combinations thereof and a member selected from the group consisting of cyclopentadienes, styrenes, terpenes, and combinations thereof.

It is preferred that the polyols employed in the present method contain from 2–22 carbon atoms. Examples of polyols which are suitable for use in the present method include, but are not limited to, the following: pentaerythritol, dipentaerythritol, tripentaerythritol, trimethylol ethane, trimethylolpropane, ditrimethylolpropane, glycerin, ethylene glycol, diethylene glycol, triethylene glycol, polyethylene glycol, 1,2-butanediol, 1,3-butanediol, 1,3-propanediol, 1,4-butanediol, 1,5-pentanediol, 1,6-hexanediol, propylene glycol, dipropylene glycol, tripropylene glycol, neopentyl glycol, 1,4-cyclohexanedimethanol, sorbitol, manitol, hexitol, glycerol monothioglycolate, 1-thioglycerol, styrene-allyl alcohol copolymer, and combinations thereof.

It is preferred that the amines employed in the present method contain from 2–22 carbon atoms. Examples of amines which are suitable for use in the present method include, but are not limited to, the following: ethylenediamine, trimehtylenediamine, tetramethylene diamine, hexamethylene diamine, N-oleyl trimethylene diamine, N-stearyl trimethylene diamine, diethylene triamine, triethylene tetramine, tetraethylene pentamine, pentaethylenehexamine, 1,2-propylene diamine, 1,2-butylene diamine, bis(trimethylene)triamine, methyliminobis(propylamine), N-coco trimethylene diamine, 2-methylpentamethylenediamine, bis(hexamethylene) triamine, 2-methylpentane-1,5-diamine, piperazine, aminoethylpiperazine, tris(aminoethyl)amine, 1,2-diaminocylcohexane, 1,3-diaminocyclohexane, 1,4-diaminocyclohexane, o-phenylenediamine, m-phenylenediamine, p-phenylenediamine, 2,4-tolylenediamine, 2,6,-tolylenediamine, bis(4-aminophenyl) methane, bis(4-aminocyclohexyl)methane, 1,8-diaminonaphthalene, 1,3-pentanediamine, and 2-[3-(1-aziridinyl)propionyloxymethyl]-1,3-bis[3-(2-methyl-1-aziridinyl)propionyloxymethyl]-2-ethylpropane, trimethylolpropane tris(2-methyl-1-aziridinepropionate), and combinations thereof.

It is preferred that the alkanolamines employed in the present method contain from 2–22 carbon atoms. Examples of alkanolamines which are suitable for use in the present method include, but are not limited to, the following: monoethanolamine, diethanolamine, triethanolamine, tris(hydroxymethyl) aminomethane, N-methylethanolamine, N-methyldiethanolamine, N-ethyldiethanolamine, N-butyldiethanolamine, N-phenyldiethanolamine, N-ethyl 2-aminobenzyl alcohol, 3-aminobenzyl alcohol, 4-aminobenzyl alcohol, 2-aminocyclohexanol, 3-aminocyclohexanol, 4-aminocyclohexanol, 2-(2-aminoethoxy)ethanol, 2-(2-aminoethylamino) ethanol, α-(1-aminoethyl) benzyl alcohol, 2-amino-2-ethyl-1,3-propanediol, 2-amino-1-hexanol, 6-amino-1-hexanol, 2-amino-1-phenylethanol, 2-amino-3-methyl-1-butanol, leucinol, isoleucinol, 2-amino-2-methyl-1,3-propanediol, 2-amino-1-pentanol, 5-amino-1-pentanol, 2-aminophenethyl alcohol, 4-aminophenethyl alcohol, 2-amino-1-phenyl-1,3-propanediol, 3-amino-1,2-propanediol, isopropanolamine, diisopropanolamine, triisopropanolamine, 3-amino-1-propanol, N-(3-aminopropyl) diethanolamine, and combinations thereof.

As appreciated in the art, the exact components and properties of components desired for any coating application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

In a flask equipped with a nitrogen system, overhead stirrer, condenser, Dean Stark trap, and thermocouple was melted 450 grams of Westvaco Rosin SS (a tall oil rosin commercially available from Westvaco Corporation) under a nitrogen atmosphere. The temperature was adjusted to 180° C.; after which 12.3 grams of bisphenol A [2-2-bis(4-hydroxyphenyl) propane] and 127.4 grams of nonylphenol were added. The temperature was reduced to 130° C. and 47.5 grams of paraformaldehyde were added over a period of 45 minutes. The mixture was maintained at a temperature of 130° C. for a period of two hours; after which the temperature was increased to 190° C. and 14.3 grams of maleic anhydride was added. The temperature was then increased to 205° C. and maintained for a period of one hour. Thereafter 62.2 grams of pentaerylthritol and 1.0 gram of lime were added, and the temperature was increased to 280° C. After two hours at 280° C., 14.3 grams of Polybutadiene R-45 HT (a hydroxy-terminated polybutadiene commercially available from Elf Atochem North America, Inc.) was added. The reaction mixture was maintained at 280° C. for 90 minutes. The resulting binder composition (hereafter referred to as Composition A) had the following properties:

1) An acid number of 21;
2) A ring and ball softening point of 152.0° C.;
3) A Gardner viscosity at 50 wt % solution of Composition A in alkaline refined linseed oil (ARLO) of Z5-; and
4) An infinite dilutability of the Composition A/ARLO solution in Magesol M-47 oil (a hydrocarbon solvent commercially available from Magic Bros. Oil Co.).

EXAMPLE 2

In a flask equipped with a nitrogen system, overhead stirrer, condenser, Dean Stark trap, and thermocouple was melted 450 grams of Westvaco Rosin SS (a tall oil rosin commercially available from Westvaco Corporation) under a nitrogen atmosphere. The temperature was adjusted to 180° C.; after which 12.3 grams of bisphenol A [2-2-bis(4-hydroxyphenyl)propane] and 127.4 grams of nonylphenol were added. The temperature was reduced to 130° C. and 47.5 grams of paraformaldehyde were added over a period of 45 minutes. The mixture was maintained at a temperature of 130° C. for a period of two hours; after which the temperature was increased to 190° C. and 14.3 grams of maleic anhydride was added. The temperature was then increased to 205° C. and maintained for a period of one hour. Thereafter 62.2 grams of pentaerythritol and 1.0 gram of lime were added, and the temperature was increased to 280° C. After two hours at 280° C., 14.3 grams of R-130 MA 13% (a polybutadiene modified with 13% maleic anhydride commercially available from Ricon Resins, Inc.) was added. The reaction mixture was maintained at 280° C. for 90 minutes. The resulting binder composition (hereafter referred to as Composition B) had the following properties:

1) An acid number of 25;
2) A ring and ball softening point of 172.0° C.;
3) A Gardner viscosity at 50 wt % solution of Composition A in alkaline refined linseed oil (ARLO) of Z8+; and
4) A dilutability of the Composition A/ARLO solution in Magesol M-47 oil (a hydrocarbon solvent commercially available from Magic Bros. Oil Co.) of 238.

EXAMPLE 3

In a flask equipped with a nitrogen system, overhead stirrer, condenser, Dean Stark trap, and thermocouple was melted 450 grams of Westvaco Rosin SS (a tall oil rosin commercially available from Westvaco Corporation) under a nitrogen atmosphere. The temperature was adjusted to 180°

C.; after which 12.3 grams of bisphenol A [2-2-bis (4-hydroxyphenyl) propane] and 127.4 grams of nonylphenol were added. The temperature was reduced to 130° C. and 47.5 grams of paraformaldehyde were added over a period of 45 minutes. The mixture was maintained at a temperature of 130° C. for a period of two hours; after which the temperature was increased to 190° C. and 14.3 grams of maleic anhydride was added. The temperature was then increased to 205° C. and maintained for a period of one hour. Thereafter 62.2 grams of pentaerythritol and 1.0 gram of lime were added, and the temperature was increased to 280° C. After two hours at 280° C., 14.3 grams of R-130 MA 8% (a polybutadiene-modified with 8% maleic anhydride commercially available from Ricon Resins, Inc.) was added. The reaction mixture was maintained at 280° C. for 90 minutes. The resulting binder composition (hereafter referred to as Composition C) had the following properties:

1) An acid number of 23;
2) A ring and ball softening point of 163.0° C.;
3) A Gardner viscosity at 50 wt % solution of Composition A in alkaline refined linseed oil (ARLO) of Z8-; and
4) A dilutability of the Composition A/ARLO solution in Magesol M-47 oil (a hydrocarbon solvent commercially available from Magic Bros. Oil Co.) of 277.

EXAMPLE 4

A series of 50/50 weight percent solutions of each of the above-noted compositions in Magie 470 oil (a hydrocarbon solvent commercially available from Magic Bros. Oil Co.) were prepared. A small amount of tridecyl alcohol was added to improve the compatibility of the resins in the oil. The resulting varnishes were employed as letdown varnishes in a heat-set ink formulation using copper phthalocyanine blue pigment. Each ink was printed on 50# Somerset coated paper. The gloss and rub-resistance properties of resulting prints were measured with a Sutherland rub-tester. The results were compared to the properties of a comparable blue ink made with a conventional phenolic-modified rosin ester binder and a wax slip additive (which had not been modified via the addition of a polybutadiene). The evaluation results are shown in Table I below.

TABLE I

Evaluation Of Inks Formulated With Binder Compositions

| Binder | Gloss at 60° C. vs. Control | Rub Resistance vs. Control |
| --- | --- | --- |
| Composition A | lower | equal |
| Composition B | equal | better |
| Composition C | equal | better |

As shown by the results noted in Table I, inks formulated with the improved binder compositions had enhanced gloss and rub resistance when compared to the standard control formulation containing a wax slip additive.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. An improved method for producing pigment binder compositions which comprises reacting in a condensation reaction:

a) about 5% to about 90% by total weight of the reactants of a member selected from the group consisting of hydrocarbon resin reaction products of a polymerization reaction between a member selected from the group consisting of maleinized rosin, fumarized rosin, and combinations thereof and a member selected from the group consisting of cyclopentadienes, styrenes, terpenes, and combinations thereof, rosin esters, phenolic-modified rosin esters, and combinations thereof;

b) about 2% to about 25% by total weight of the reactants of a member selected from the group consisting of polyols containing from 2 to 6 hydroxyl groups, amines containing from 2 to 5 amine groups, alkanolamines containing from 2 to 6 amine groups and/or hydroxyl groups, and combinations thereof, and c) wherein the improvement comprises the addition of about 2% to about 50% by total weight of the reactants of a member selected from the group consisting of butadiene homopolymers containing at least one amine group, butadiene homopolymers containing at least one carboxyl group, butadiene homopolymers containing at least one hydroxyl group, butadiene homopolymers containing at least one anhydride group, butadiene homopolymers containing at least one epoxy group, and combinations thereof, to produce the pigment binder composition.

2. The method of claim 1 which further comprises reacting in a condensation reaction:

a) about 60% to about 80% by total weight of the reactants of a member selected from the group consisting of hydrocarbon resin reaction products of a polymerization reaction between a member selected from the group consisting of maleinized rosin, fumarized rosin, and combinations thereof and a member selected from the group consisting of cyclopentadienes, styrenes, terpenes, and combinations thereof, rosin esters, phenolic-modified rosin esters, and combinations thereof;

b) about 5% to about 15% by total weight of the reactants of a member selected from the group consisting of polyols containing from 2 to 6 hydroxyl groups, amines containing from 2 to 5 amine groups, alkanolamines containing from 2 to 6 amine groups and/or hydroxyl groups, and combinations thereof, and c) wherein the improvement comprises the addition of about 10% to about 25% by total weight of the reactants of a member selected from the group consisting of butadiene homopolymers containing at least one amine group, butadiene homopolymers containing at least one carboxyl group, butadiene homopolymers containing at least one hydroxyl group, butadiene homopolymers containing at least one anhydride group, butadiene homopolymers containing at least one epoxy group, and combinations thereof, to produce the pigment binder composition.

3. The method of claim 1 wherein the rosin ester is the product of an esterification reaction between a polyol ester having a chain length of from 2 to 6 carbons and a member selected from the group consisting of maleinized rosin, fumarized rosin, and combinations thereof.

4. The method of claim 1 wherein the phenolic-modified rosin ester is the product of a condensation reaction between a rosin ester and a member selected from the group consisting of phenolic resins, allyl-substituted phenols, and combinations thereof.

5. The method of claim 1 wherein the polyol contains from 2 to 22 carbon atoms.

6. The method of claim 1 wherein the polyol is a member of the group consisting of pentaerythritol, dipentaerythritol, tripentaerythritol, trimethylol ethane, trimethylolpropane, ditrimethylolpropane, glycerin, ethylene glycol, diethylene glycol, triethylene glycol, polyethylene glycol, 1,2-butanediol, 1,3-butanediol, 1,3-propanediol, 1,4-butanediol, 1,5-pentanediol, 1,6-hexanediol, propylene glycol, dipropylene glycol, tripropylene glycol, neopentyl glycol, 1,4-cyclohexanedimethanol, sorbitol, manitol, hexitol, glycerol monothioglycolate, 1-thioglycerol, styrene-allyl alcohol copolymer, and combinations thereof.

7. The method of claim 1 wherein the amine contains from 2 to 22 carbon atoms.

8. The method of claim 1 wherein the amine is a member of the group consisting of ethylenediamine, trimehtylenediamine, tetramethylene diamine, hexamethylene diamine, N-oleyl trimethylene diamine, N-stearyl trimethylene diamine, diethylene triamine, triethylene tetramine, tetraethylene pentamine, pentaethylenehexamine, 1,2-propylene diamine, 1,2-butylene diamine, bis(trimethylene) triamine, methyliminobis(propylamine), N-coco trimethylene diamine, 2-methylpentamethylenediamine, bis(hexamethylene) triamine, 2-methylpentane-1,5-diamine, piperazine, aminoethylpiperazine, tris(aminoethyl)amine, 1,2-diaminocylcohexane, 1,3-diaminocyclohexane, 1,4-diaminocyclohexane, o-phenylenediamine, m-phenylenediamine, p-phenylenediamine, 2,4-tolylenediamine, 2,6,-tolylenediamine, bis(4-aminophenyl)methane, bis(4-aminocyclohexyl)methane, 1,8-diaminonaphthalene, 1,3-pentanediamine, and 2-[3-(1-aziridinyl)propionyloxymethyl]-1,3-bis[3-(2-methyl-1-aziridinyl)propionyloxymethyl]-2-ethylpropane, trimethylolpropane tris(2-methyl-1-aziridinepropionate), and combinations thereof.

9. The method of claim 1 wherein the alkanolamine contains from 2 to 22 carbon atoms.

10. The method of claim 1 wherein the alkanolamine is a member of the group consisting of monoethanolamine, diethanolamine, triethanolamine, tris(hydroxymethyl) aminomethane, N-methylethanolamine, N-methyldiethanolamine, N-ethyldiethanolamine, N-butyldiethanolamine, N-phenyldiethanolamine, N-ethyl 2-aminobenzyl alcohol, 3-aminobenzyl alcohol, 4-aminobenzyl alcohol, 2-aminocyclohexanol, 3-aminocyclohexanol, 4-aminocyclohexanol, 2-(2-aminoethoxy)ethanol, 2-(2-aminoethylamino)ethanol, α-(1-aminoethyl) benzyl alcohol, 2-amino-2-ethyl-1,3-propanediol, 2-amino-1-hexanol, 6-amino-1-hexanol, 2-amino-1-phenylethanol, 2-amino-3-methyl-1-butanol, leucinol, isoleucinol, 2-amino-2-methyl-1,3-propanediol, 2-amino-1-pentanol, 5-amino-1-pentanol, 2-aminophenethyl alcohol, 4-aminophenethyl alcohol, 2-amino-1-phenyl-1,3-propanediol, 3-amino-1,2-propanediol, isopropanolamine, diisopropanolamine, triisopropanolamine, 3-amino-1-propanol, N-(3-aminopropyl) diethanolamine, and combinations thereof.

11. The pigment binder composition of claim 1.

12. An ink formulation comprising the pigment binder composition of claim 1 and a pigment dispersion.

* * * * *